United States Patent
Bogart et al.

(10) Patent No.: US 6,452,696 B1
(45) Date of Patent: Sep. 17, 2002

(54) METHOD AND APPARATUS FOR CONTROLLING MULTIPLE LIGHT SOURCES IN A DIGITAL PRINTER

(75) Inventors: Zac Bogart; Brian Hart, both of Santa Barbara, CA (US); James Browning, Lebanon, NH (US)

(73) Assignee: Zbe Incorporated, Santa Barbara, CA (US)

( * ) Notice: Subject to any disclaimer, the term of this patent is extended or adjusted under 35 U.S.C. 154(b) by 0 days.

(21) Appl. No.: 09/303,226

(22) Filed: Apr. 30, 1999

Related U.S. Application Data

(60) Provisional application No. 60/083,902, filed on May 1, 1998.

(51) Int. Cl.[7] .............................................. G06K 15/00
(52) U.S. Cl. ........................................ 358/1.9; 358/1.1
(58) Field of Search ............................ 358/1.1, 1.2, 1.8, 358/1.9, 1.13, 296, 302; 347/19, 17, 13, 60, 185, 186, 237, 240, 74, 82, 131, 132

(56) References Cited

U.S. PATENT DOCUMENTS

| | | | |
|---|---|---|---|
| 3,832,488 A | 8/1974 | Fahey et al. | 178/15 |
| 3,988,742 A | 10/1976 | Meier et al. | 346/107 R |
| 4,000,495 A | 12/1976 | Pirtle | 345/7 |
| 4,074,320 A | 2/1978 | Kapes, Jr. | 358/230 |
| 4,342,504 A | 8/1982 | Ebner | 354/7 |
| 4,364,064 A | 12/1982 | Baues | 346/107 R |
| 4,389,655 A | 6/1983 | Baues | 346/107 R |
| 4,475,115 A | 10/1984 | Garbe et al. | 346/108 |
| 4,563,747 A | 1/1986 | Tidd | 364/523 |
| 4,590,492 A | 5/1986 | Meier | 346/107 R |
| 4,797,691 A | 1/1989 | Akiyoshi et al. | 346/108 |
| 4,835,549 A * | 5/1989 | Samejima et al. | 347/191 |
| 5,093,682 A | 3/1992 | Hicks | 355/1 |
| 5,623,300 A * | 4/1997 | Itoh et al. | 347/237 |

* cited by examiner

*Primary Examiner*—Arthur G. Evans
(74) *Attorney, Agent, or Firm*—Freilich, Hornbaker & Rosen

(57) ABSTRACT

A method and apparatus for normalizing the output of multiple light sources used to expose a photosensitive material to print high quality continuous tone and/or color images. Each of the multiple light sources is driven by a different signal weighted to cause all of the light sources to output light of intensity appropriate to produce a uniform image density over a wide range of image densities. In a preferred embodiment, each light source is driven by a different digital-to-analog converter (DAC) and/or timer circuit. A control processor supplies a multibit correction value tog each DAC and/or timer circuit to supply a drive signal to its associated light source weighted to cause all of the light sources to output light of substantially uniform intensity at a certain intensity level.

23 Claims, 10 Drawing Sheets

METHOD AND APPARATUS FOR CONTROLLING MULTIPLE LIGHT SOURCES IN A DIGITAL PRINTER

RELATED APPLICATION

This application claims priority based on provisional application No. 60/083,902 filed May 1, 1998.

FIELD OF THE INVENTION

This invention relates generally to a method and apparatus for producing high quality continuous tone and/or color images on photosensitive material (i.e., photographic paper or film) from information provided in digital form. More particularly, this invention relates to a method and apparatus for controlling a plurality of light sources to enable them to produce high quality continuous tone images on photosensitive material.

DESCRIPTION OF PRIOR ART

In the field of photographic digital printers and image setters, the use of multiple light sources to simultaneously expose multiple individual pixels is well known. U.S. Pat. No. 3,988,742 describes using light emitting diodes (LED's) and fiber optic tubes to deliver light to the photosensitive material. Applications of this technology have included typesetting and the generation of lithographic films for printing. In these applications, each LED is typically coupled to the input end of a fiber optic tube and the output ends of multiple tubes are arranged in a linear array. As photosensitive material is transported past the linear array, a digital controller energizes the LED's to form a latent image on the photosensitive material. This process is described in U.S. Pat. Nos. 3,832,488 and 4,000,495 and 5,093,682.

In typical typesetting and lithographic applications, it is generally unnecessary to provide for continuous tonal values. Rather, each light source is generally driven to saturate the photosensitive material. Exposure in excess of what is needed for saturation has essentially no effect. Accordingly, in such printing systems, it is only necessary to drive the light sources to such an extent that the dimmest light source saturates the photosensitive material. Thus, there is generally no need to precisely match the outputs of the multiple light sources.

Continuous tone images are predominately comprised of intermediate tonal values of color or gray tones. The formation of high quality continuous tone images by multiple light sources requires that the sources be precisely matched. Failure to match the light sources, at all useable light levels, will typically produce unwanted lines or artifacts in the printed image. U.S. Pat. No. 3,988,742 generally recognizes the need for normalization of light sources to minimize mismatches.

Photosensitive materials exhibit two well known and undesirable properties called (1) latent image degradation and (2) reciprocity failure. Latent image degradation causes the image exposed onto photosensitive material to change between the time the material is exposed and the time it is processed. Reciprocity failure causes photosensitive materials to respond differently to identical amounts of illumination depending on the duration and intensity of the illumination. For example, a first exposure of X intensity for Y seconds may produce a different result than a second exposure of X/2 intensity for 2Y seconds. These two properties can produce unwanted artifacts to appear in the printed image.

SUMMARY OF THE INVENTION

The present invention is directed to a method and apparatus for normalizing the output of multiple light sources used to expose a photosensitive material in order to print high quality continuous tone and/or color images.

In accordance with one aspect of the invention, each of the multiple light sources is driven by a different signal weighted to cause all of the light sources to output light of intensity appropriate to produce a uniform image density over a wide range of image densities.

In accordance with a preferred embodiment of the invention, each light source is driven by a different digital-to-analog converter (DAC). A control processor supplies a multibit intensity correction value to each DAC enabling each DAC to supply a drive signal to its associated light source weighted to cause all of the light sources to output light of substantially uniform intensity at a certain intensity level.

In accordance with the preferred embodiment, each light source is further driven by a different timer circuit. Exposing efficiency data for each light source is stored in an exposure normalization lookup table which is accessed by the processor to supply a multi-bit exposure time correction value to each timer circuit to control the on-duration of its associated light source. This allows each light source to produce a normalized exposing efficacy over a wide range of print density levels.

In accordance with another aspect of the invention, the apparatus is used to produce a test image pattern which is then scanned to determine the relative exposing efficacy of each light source. This exposing efficacy data is used to build the aforementioned normalization look up tables.

In the preferred embodiment, the exposing efficacy of each of the multiple light sources is measured by first exposing a predetermined test image pattern onto photosensitive material. The photosensitive material is then processed to reveal the image. The image is then scanned into a computer for subsequent analysis. The test image is configured to enable the computer to determine which of the multiple light sources exposed each particular area of the test image. Upon analysis of the test image, the computer assesses the relative exposing efficacy of each of the multiple light sources. This is done by measuring the image density in multiple areas corresponding to each of the light sources. Based on the density variations within the image, the intensity correction values to be applied to the DACs, and the exposure time values to be applied to the timer circuits are calculated. The test image is then reprinted and the analysis process repeated until a visually satisfactory hard copy test image is produced.

The properties of latent image degradation and reciprocity failure can produce visible artifacts in the image proximate to the edges of a scan strip. That is, light sources close to the edge of a scan strip typically become more effective at higher densities than the light sources in the middle of the scan. By individually normalizing the light sources in accordance with the invention over the range of image densities within the printing spectrum, this variation can be effectively eliminated.

DETAILED DESCRIPTION

Figure 1:
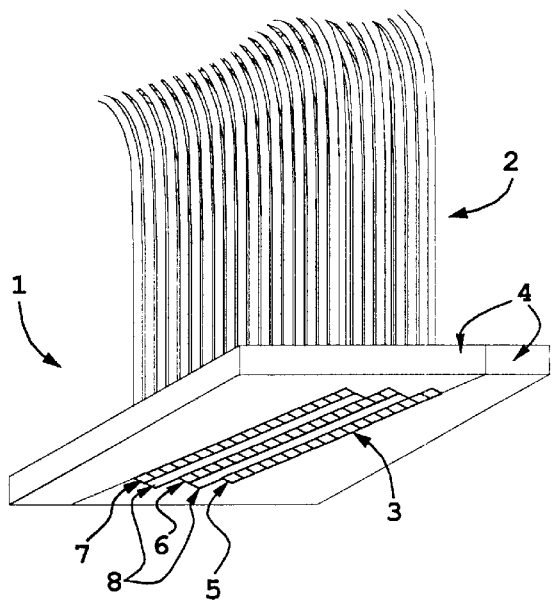
FIG. 1 is a schematic isometric illustration of an exposing head comprising a rectangular array of square fiber optic tube ends useful in a preferred embodiment of the invention.

FIG. 1 shows an imaging (or print) head 1 useful in a printer (FIG.2) suitable for embodying apparatus in accordance with the present invention. The head 1 is comprised of a plurality of light sources, e.g., fiber optic tubes 2 preferably having uniform square cross section ends 3, enabling them to be readily clamped or bonded in frame 4 in precise alignment arranged in columns 5,6,7. The columns may be arranged in contact, or spaced apart with precision spacers 8 with each column preferably containing the same number of tube ends 3. Although the assembly as shown in FIG. 1 has a planar surface, other surface shapes are possible. For example, curved surfaces have the advantage of being able to contour to the surface of a drum 10 (FIG. 2) around which photosensitive material 11 is passed, or to correct for focus aberrations common to lenses. The input ends of the fiber optic tubes 2 are coupled to independently excitable light sources, preferably light emitting diodes (LEDs) in LED bank 12. The multiple LEDs are selected to be matched as closely as feasible. The fiber optic tubes 2 deliver light from the light sources to expose the photosensitive material 11 with each tube end forming a latent pixel image on the material 11. An alternative embodiment of the invention could eliminate the fiber optic tubes and instead mount multiple LEDs directly into frame 4.

Figure 2:
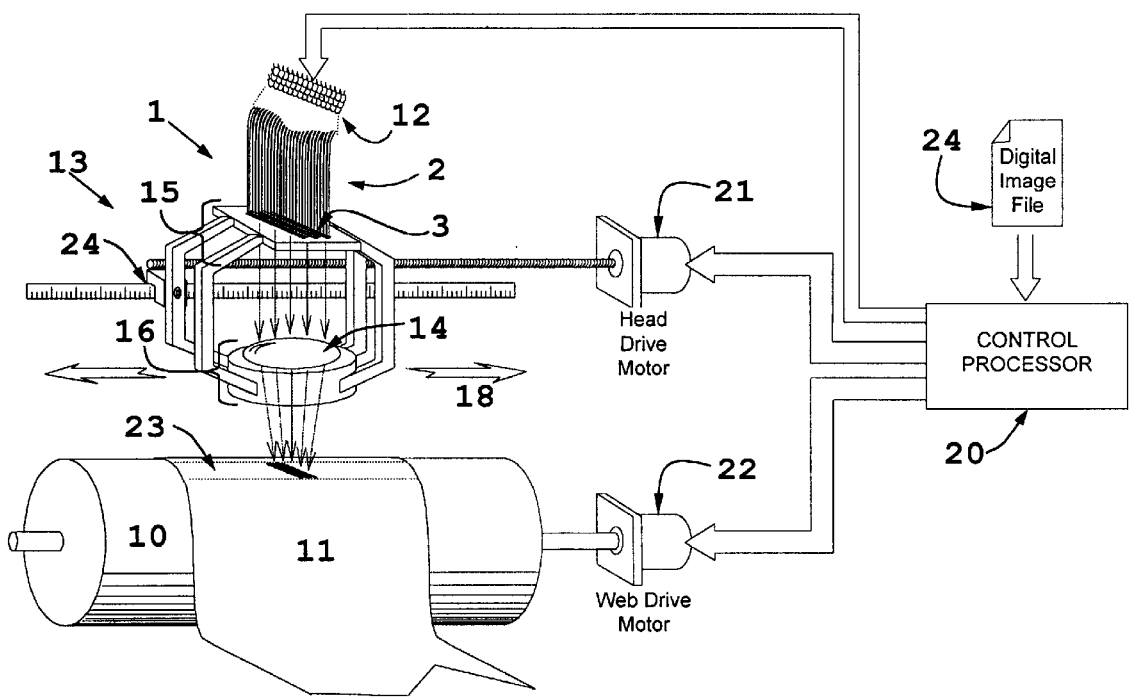
FIG. 2 is a schematic illustration of a digital printer comprising a drum for transporting a photosensitive material web past a print head mounted to linearly scan across the width of the web.

FIG. 2 shows the head 1 in place in a preferred printer embodiment 13 in accordance with the invention. The printer 13 is described in a co-pending U.S. patent application Ser. No. 09/303,258 , entitled "Method And Apparatus For Recording Digital Images On Photosensitive Material" by Zac Bogart. The head 1 is mounted so that the image of the output ends 3 of the fiber optic tubes 2 is projected via a lens 14 onto the photosensitive material 11 which is tensioned around the drum 10. The head 1, carried by frame 15, and lens assembly 16 are mounted for linear movement in a scan direction 18 parallel to the axis of the drum 10.

The printer 13 is controlled by a control processor 20, e.g., a computer or microprocessor, which activates a head drive motor 21 and a web drive motor 22. The head drive motor 21 linearly scans the print head 1 and lens assembly 16 across the width of the web to expose a web strip 23. As the print head scans, encoder 24 generates an output signal which indicates to the processor 20, the columnar position of the print head along the scan line. The web drive motor 22 rotates the drum 10 to move the web 11 longitudinally past the print head. Typically, the web is stepped a distance approximately equal to the longitudinal dimension of the strip 23 after each print head scan.

The control processor 20 also controls the multiple light sources in LED bank 12 in response to a digital image file 24 accessed by the processor. The image file 24 digitally describes the image to be exposed onto the photosensitive material 11 by the exposing head 1.

Figure 3A:
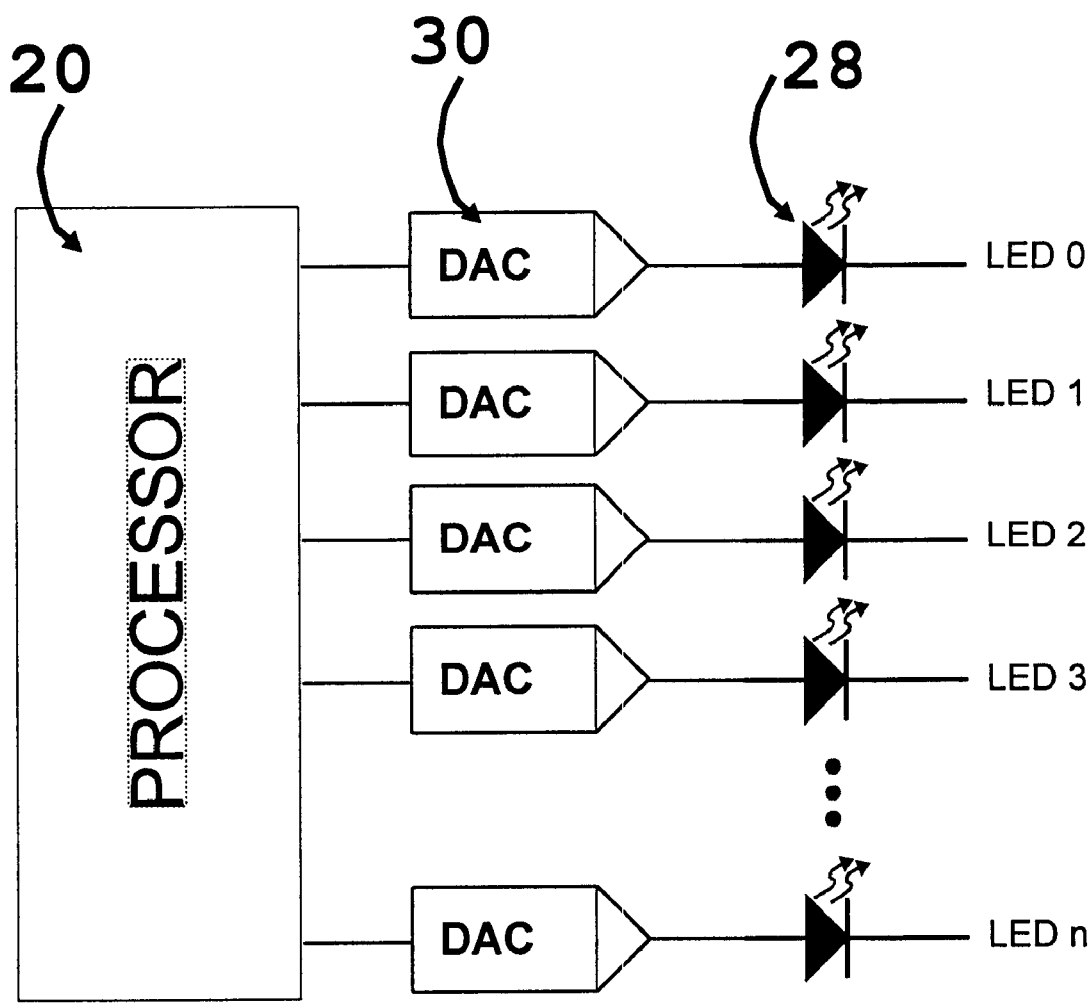
FIG. 3A is a schematic illustration of multiple LED light sources useful in the print head of FIG. 1 driven by a control processor, via digital-to-analog converters (DACs)

FIG. 3A schematically depicts processor 20 controlling the multiple light sources 28 (represented by $LED_o$-$LED_n$) in head 1 as the head scans. Selective energization of the light sources 28 by the processor 20 exposes the photosensitive material 11 to form a latent image on the material. Each light source 28 is controlled by a digital to analog converter (DAC) 30 which produces an analog drive signal in response to a digital drive signal supplied thereto by the processor 20. Although it is preferred that all of the physical light sources 28 exhibit precisely the same exposing efficacy, i.e., light output intensity vs. analog drive signal, as a practical matter, it is extremely difficult, if not impossible, to precisely match the multiple light sources. In accordance with one aspect of the present invention, as will be described hereinafter, the relative exposing efficacy of each light source is first determined and then the processor 20 provides intensity correction values to the DACs to normalize the intensity of the multiple light sources.

Figure 3B:
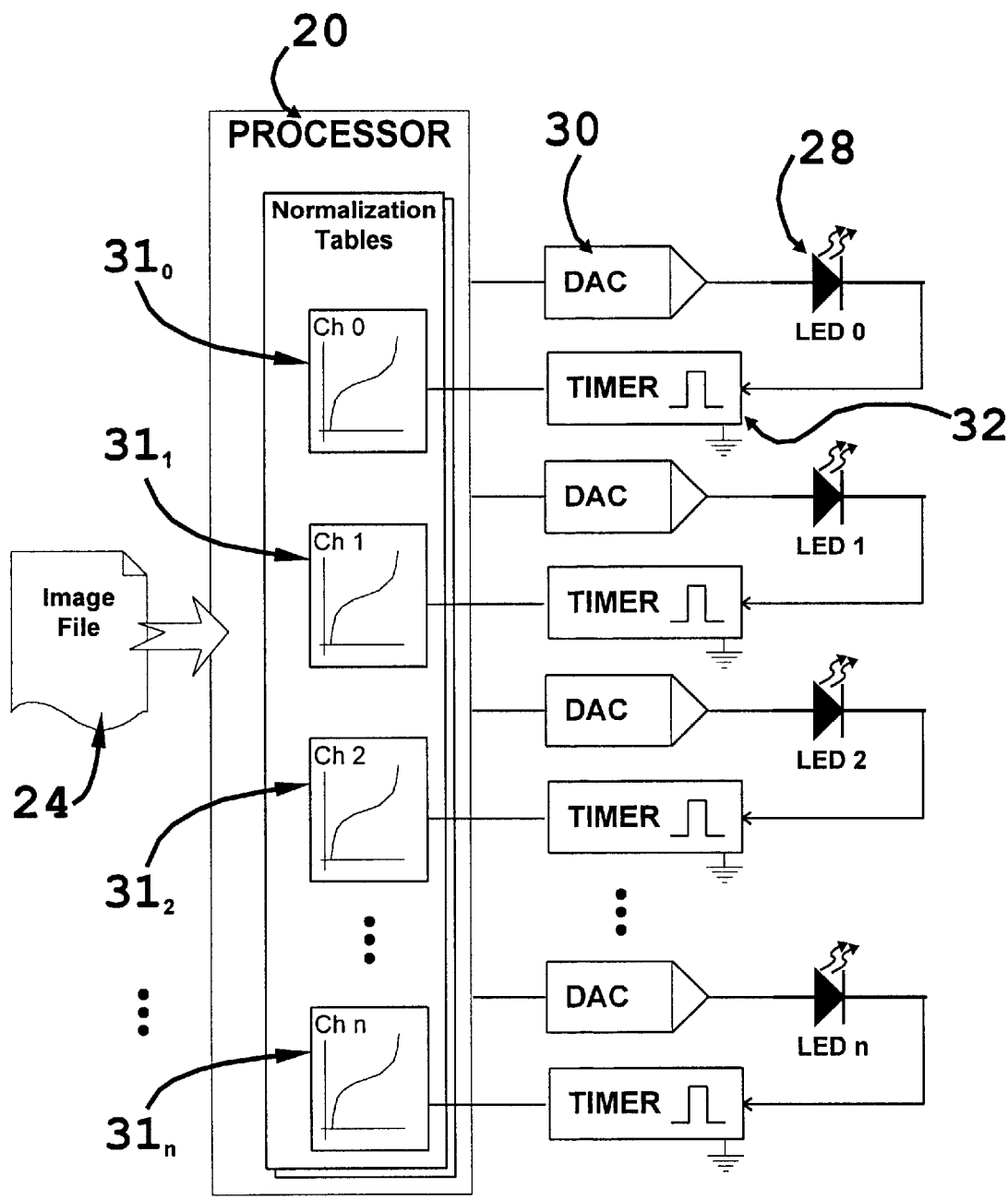
FIG. 3B is a schematic illustration similar to FIG. 3A showing the incorporation of timers for controlling the exposure duration of each LED.
Figure 3C:
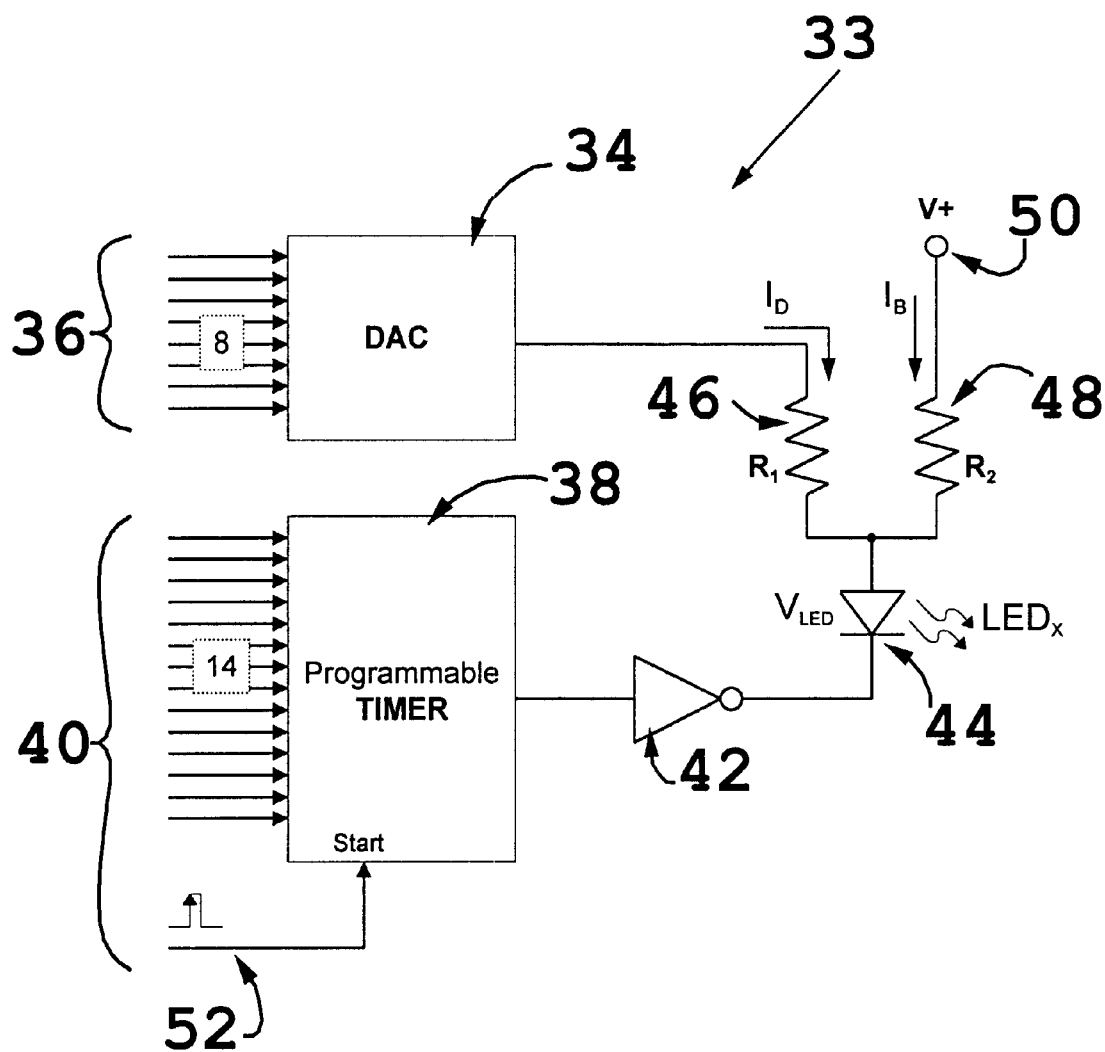
FIG. 3C is a schematic representation of the control circuit for each LED of FIG. 3B.
Figure 3D:
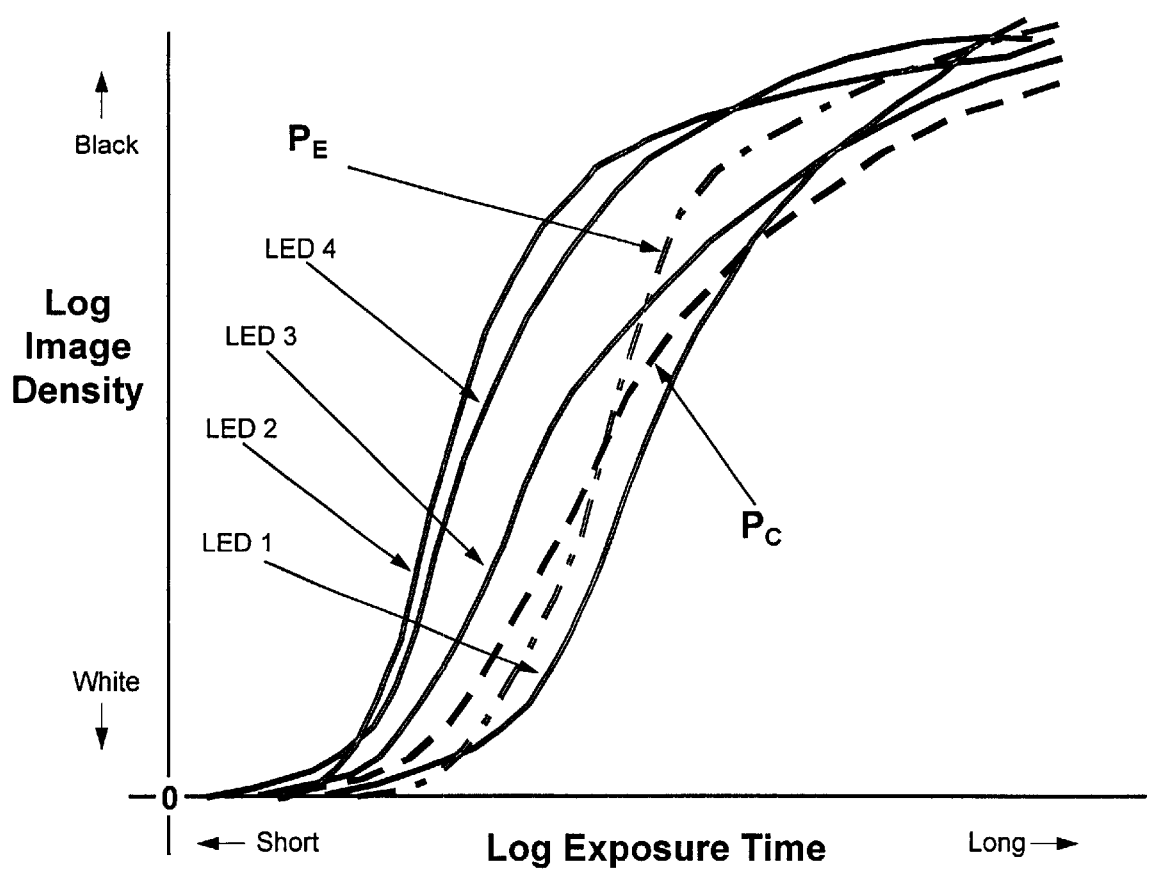
FIG. 3D depicts image density vs. exposure time performance curves for a typical population of uncorrected LEDs and normalized curves Pc and Pe.

FIG. 3D depicts exemplary Image Density vs. Exposure Time performance curves for a population of typical uncorrected light sources (e.g. LEDs) used to expose photosensitive material. In order to produce continuous tone images without visible artifacts, each light source performance curve preferably conforms to a common curve, e.g. Pc. Using DACs as shown in FIG. 3A allows the separate performance curves of the multiple light sources to be matched at one point on each curve. In accordance with the present invention, in order to normalize the curves of all light sources, a separate normalization lookup table is created for each light source. Each normalization lookup table contains the exposure times to achieve each exposure density for the given light source. Accordingly, as shown in FIG. 3B, a different timer circuit 32 is operatively coupled to each light source 28 and DAC 30. Each timer circuit 32 receives exposure times from the processor 20, as derived from the look up table 88 (FIG. 5), each time the light source is energized.

FIG. 3C shows a preferred control circuit 33 for driving a single light source 44, e.g. $LED_x$. Circuit 33 includes DAC 34 which generates an output voltage, Vout, according to a digital intensity correction input 36 presented to the DAC by processor 20. The output voltage from DAC 34 generates a current ID through resistor 46 according to the formula (Vout−Vled)R1. In addition to the current ID, a bias current IB may be applied to the LED 44 from resistor 48 according to the formula (V+−Vled)R2. The bias current serves to increase the brightness of the LED 44 and to simultaneously increase the resolution of the DAC 34. Increasing the resolution of the DAC 34 allows a higher precision of normalization of the LEDs 44.

Still referring to FIG. 3C, the inverter 42 sinks the drive current, ID+IB from the LED 44 and serves as the switch for turning the LED on and off. The LED 44 is turned on when the output of the inverter 42 is low, which corresponds to the output of the programmable timer 38 being high. The output of the programmable timer 38 is high for an on-duration initiated by the start pulse applied to input 52 by processor 20. The output of the programmable timer 38 stays high for a period of time corresponding to a digital exposure time correction input 40 supplied by processor 20. In an exemplary embodiment of the invention, the programmable timer 38 has a resolution of 14 bits, corresponding to 16,385 separate programmable time durations. During the on-duration when the LED 44 is illuminated, its intensity is determined by the currents ID and IB respectively supplied through resistors 46 and 48. The magnitude of the current ID is attributable to the digital input 36 supplied by processor 20 which in the exemplary embodiment, has a resolution of 8 bits.

Thus, it should now be understood that for each light source, and for each energization of each light source (i.e., a single pixel exposure), the processor 20 provides the intensity correction input to its DAC 34 and the exposure time correction input to its timer 38. In accordance with the preferred embodiment, these digital inputs are generated by a table look-up procedure executed by the processor. That is, for each light source, the processor 20 stores (1) an intensity correction number (e.g. 8 bits) and (2) a plurality of exposure time correction numbers (e.g., each of 14 bits). The particular exposure time number selected by the processor 20 depends upon the image density desired for the pixel being exposed.

For an alternative embodiment of the invention (FIG. 3E), the DACs 34 can be omitted. A trimming resistor R3 can be installed at the time of manufacture to achieve coarse normalization between multiple LEDs 44. Precision normalization is accomplished by exposure time values supplied to timer 38 from processor 20.

In order to initially generate the aforementioned intensity correction and exposure time correction tables, a calibration procedure is performed in which the head exposes a test image pattern (FIG. 4) onto a photosensitive material sheet. The sheet is then processed to produce a hard copy test pattern image. The hard copy is then scanned into a computer (FIG. 5) which executes a normalization program (FIG. 6) to produce the intensity correction and exposure time values required to form the look up tables. In an alternative embodiment, the normalization program could be used to develop a suitable formula for generating the correction values as needed rather than storing look up tables.

Figure 4:
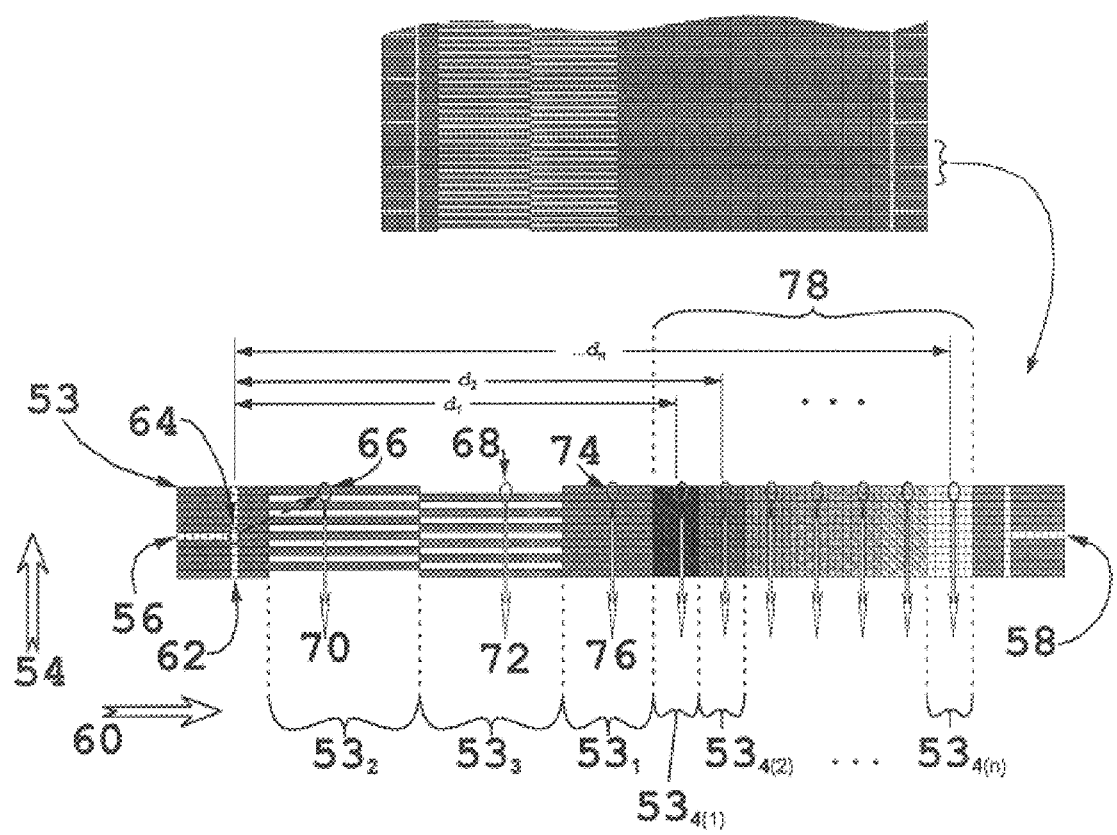
FIG. 4 is an illustration of a preferred test image pattern which can be printed by the apparatus of FIG. 2 for use in analyzing the exposing efficacy of each of the multiple light sources in the print head.

Attention is now directed to FIG. 4 which depicts a preferred test image pattern 53 suitable for being analyzed by the aforementioned calibration procedure to determine the exposure efficacy of each of the multiple light sources. The test image 53 is formed by the print head scanning across the photosensitive material to expose a strip 23 (FIG. 2). The test image 53 can be considered as comprised of a rectangular matrix of pixel locations. Each row (raster line) of the matrix is exposed by a different one of the multiple print head LEDs. As the head scans, each LED is controlled by the processor 20 to collectively produce the test image 53. Briefly, the test image 53 is comprised of the following areas from left to right:

$53_1$—a uniform density region formed by all LEDs
$53_2$—a striped region formed by even numbered LEDs
$53_3$—a striped region formed by odd numbered LEDs
$53_{4(I)}$–$53_{4(x)}$—multiple regions, each of uniform density formed by all LEDs, but with the multiple regions being of different densities.

Figure 5:
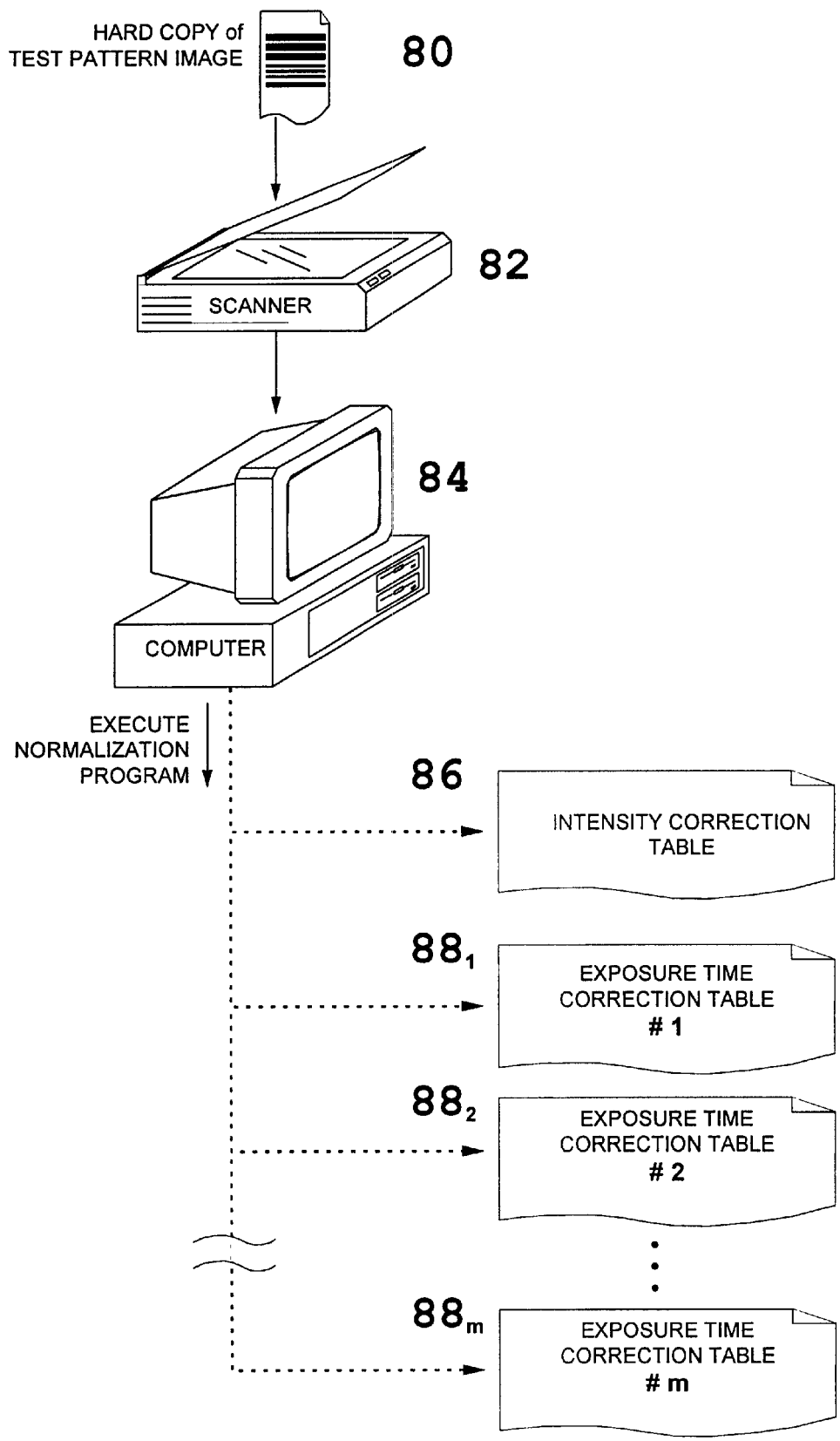
FIG. 5 is a block diagram schematically depicting the use of a scanner to analyze the test image of FIG. 4 to produce the intensity correction values and exposure time values for respectively controlling the DAC'and timer circuits of FIG. 3B.

With reference to FIG. 5, after the hard copy test image 80 is produced, it is scanned by scanner 82 to produce a digital file representing the density of each scanned pixel. The scan resolution should equal or exceed the print resolution. The test image file is then processed by computer 84 which executes a normalization program to analyze the image and ultimately produce the intensity correction table 86 and/or multiple exposure time correction tables $88_I$–$88_M$.

During the analysis, the output voltages from the DACs are adjusted in order to adjust the intensities of the LEDs 94 and hence normalize the outputs of the light sources at a single intensity level to produce table 86. Based on further analysis of the test image, separate normalization lookup tables 88 of exposure times are created for each LED in order to normalize the exposing efficacy of each light source at each of a series of different image densities.

Figure 3E:
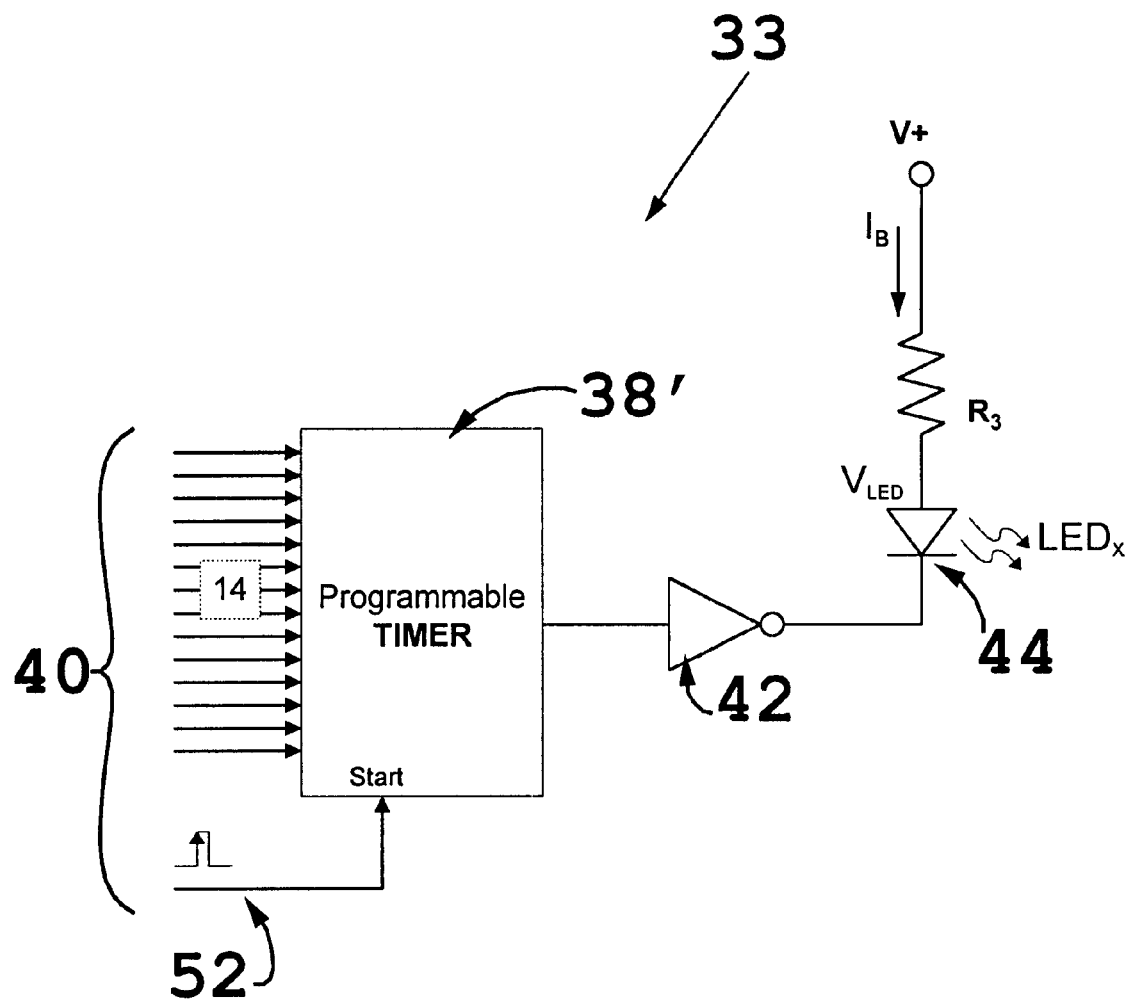
FIG. 3E is a schematic representation of an alternative embodiment of LED control circuit.

As previously mentioned, the tables 86, 88 are used during the exposing of an image when the pixels to be printed are specified in a digital image file 24. The data in the image file specifies the density of each of the pixels to be printed. As each pixel is to be exposed, the processor 20 looks up the necessary exposure time for each LED in the appropriate table and presents the digital number representative thereof to the appropriate LED timer 38 (FIGS. 3C & 3E).

Figure 6:
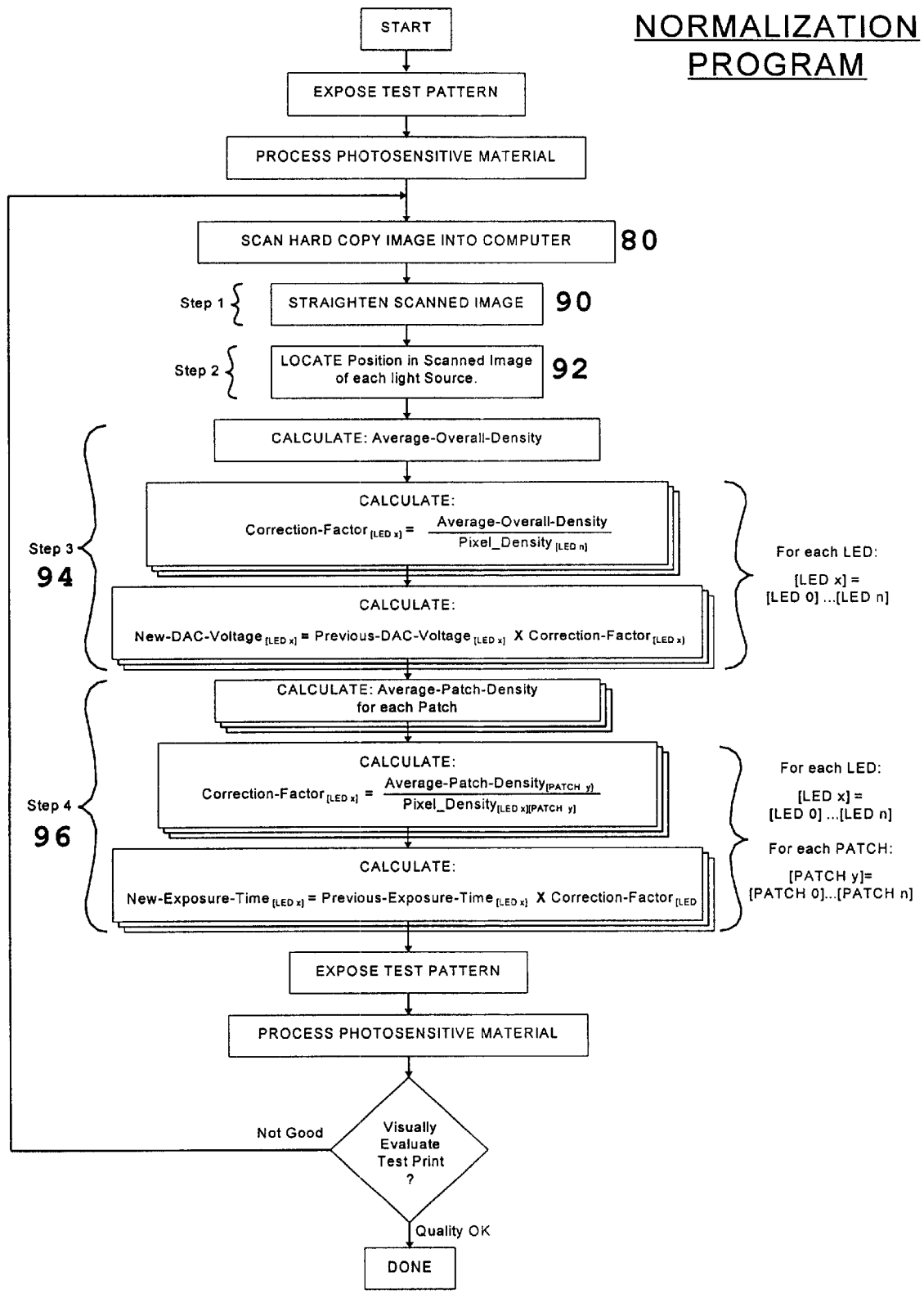
FIG. 6 is a flow chart describing a preferred analysis and normalization program executed by the control processor in accordance with the invention.

Attention is now directed to FIG. 6 which describes the normalization program executed by computer 84. After the hard copy is scanned 82, the first step 90 in the analysis is to rotate the image so that it is straight with respect to the light sources which exposed it. This is necessary in order to assure that each raster line in the image was exposed by only one of the light sources. When this condition is met, each raster line can be associated with the light source which exposed it, and the efficacy of that light source can be determined by assessing the density of the pixels along that raster line. In order to straighten the image, horizontal reference lines are located in the image file. The lines are identified by analyzing the pixel values in the image file using common and well known image processing techniques. The lines are located by parsing the image as follows:

Starting in the lower left corner of the image 53 (FIG. 4), the image is parsed in a northerly direction 54 until the first horizontal reference line 56 is located. Next, starting at the lower right corner of the test image, the image is parsed in a northerly direction 54 until the second horizontal reference line 58 is located. Based upon the difference in vertical position of the first and second horizontal reference lines, the test image is rotated to such an extent that both horizontal reference lines fall on the same raster line within the image file. In the test image, both horizontal reference lines were produced by the same individual light source. Consequently the rotation process results in an image which is perfectly straight with regards to the scan direction of the light sources. At this stage, all the points created by a particular light source fall on a particular horizontal row or raster line of the image file. Further analysis proceeds with the newly straightened version of the image.

The second step 92 in the analysis of the image is to locate, for each light source, the raster line within the image file which was exposed by that light source. On the test image, a section of horizontal lines, exposed by predetermined light sources is printed.

Each light source exposes one horizontal line. By parsing the image, perpendicular to the horizontal lines, the individual horizontal raster lines are identified within the image file which correspond to each of the individual light sources. The horizontal lines are parsed as follows: Starting with the first horizontal reference line 56 (FIG. 4), the image is parsed in an easterly direction 60 until the vertical reference line 62 is located. Next, a point 66 is located which is predetermined distance north and east of the intersection 64 reference lines. Starting at that point 66, the image is parsed in a southerly direction 70 across a series of lines produced by the even numbered light sources. For each of the even numbered light sources, the horizontal raster line within the image file produced by the corresponding light source is identified. Next, a second point 68 is located at a second predetermined distance from the first intersection of the reference lines. Starting at that point 68 the image is parsed in a southerly direction 72 across a series of lines produced by the odd numbered light sources. For each of the odd numbered light sources, the horizontal raster line within the image file produced by the corresponding light source is identified. With this process is completed, each light source on the printer is correlated to a horizontal raster line within the image file.

With the raster lines within the image file correlated to the individual light sources which exposed them, the data from said raster lines within the image may be analyzed in order to determine, and normalize, the intensity of the individual light sources. The third step 94 in the analysis is to calculate the individual normalization factors for each of the multiple light sources' DACs. For each light source, the image data produced by that light source may be analyzed. The exposure density of the image, is analyzed in the area proximate to the light source which exposed it. The intensity of each light source is normalized by means of adjusting it's individual DAC. In order to gather the data necessary to normalize the light sources, the image is parsed as follows: A point 74 is located which is a predetermined distance north and east of the intersection 64 of the reference lines. Starting at that point 74, the image is parsed in a southerly direction across an evenly exposed gray section of image. On each raster line corresponding to a particular light source, the image density is measured. The ratio between the image density on that horizontal raster line and the average of the densities at all of the horizontal raster lines within this section of the image is calculated for use as the normalization factor. Said normalization factor is then applied to the binary number being supplied to the DAC associated with that same light source. The process of measuring the density, calculating the difference from the average density, and applying a correction factor to the DAC, is repeated for each light source in the printer. Upon completion of this step, the intensities of the light sources have been normalized. Note that in the alternative embodiment of the invention depicted in FIG. 3E, the DACs have been eliminated and normalization is carried out using step 4 below.

The fourth step 96 in the analysis is to calculate the individual normalization factors for each of the multiple light sources, at each of the printed densities 53.4 on the test image. For each light source, in each density region, the image data produced by that light source is analyzed. The exposure density of the image, is analyzed in the area proximate to the light source which exposed it. An exposure correction factor is calculated which is equal to the exposure density produced by said light source divided by the average exposure density in that density area. In order to gather the data necessary to normalize the exposures, the image is parsed as follows: A series of points 78 (FIG. 4) are located, the first of which is located a predetermined distance north and east of the intersection 64 of the reference lines, and which are equally spaced in an easterly direction 60. Starting at that point 78, the image is parsed in a southerly direction across an evenly exposed section of image of a particular density. On each raster line corresponding to a particular light source, the image density is measured. The ratio between the image density on that horizontal raster line and the desired density for that section of the image is calculated for use as the normalization factor. This normalization factor is applied to the normalization lookup table for the particular light source. The normalization factor is applied to the entry in normalization lookup table which corresponds to the desired density to be produced. The process of measuring density, calculating the difference from the desired density, and applying a correction factor to the exposure correction lookup tables, is repeated for each light source in the printer, and for each density section in the test image. In the exemplary test image used by the inventors, normalization is conducted at 17 different densities. It is understood that a normal continuous tone image contains many more than 17 densities. Thus, a test image containing a greater number of different density regions could be used and/or exposure times for intermediate densities can be determined by interpolation. That is, following the steps of normalizing the light sources at 17 densities, exposure times for all remaining possible intermediate densities are calculated from the 17 normalized exposure times, using well known mathematical interpolation techniques. Upon completion of this step, the light sources have been normalized to each density between white and black.

It should be understood that the above series of steps must be applied separately to each of the primary printing colors, which are usually Cyan, Magenta and Yellow, but may also include other primary colors. It should also be understood that this process may be applied to each color by printing separate, individually colored, test images. It should also be understood that the color gray is composed of equal parts of the primary colors, and consequently this analysis may be performed for each separate color by analyzing the same, gray colored, image. The specific test image used by the inventors and depicted in FIG. 4 is one possible design of such an image. The procedure should work equally well with other test images which allow the positions within the image to be correlated to the individual light source which exposed that portion of said image.

Figure 7:
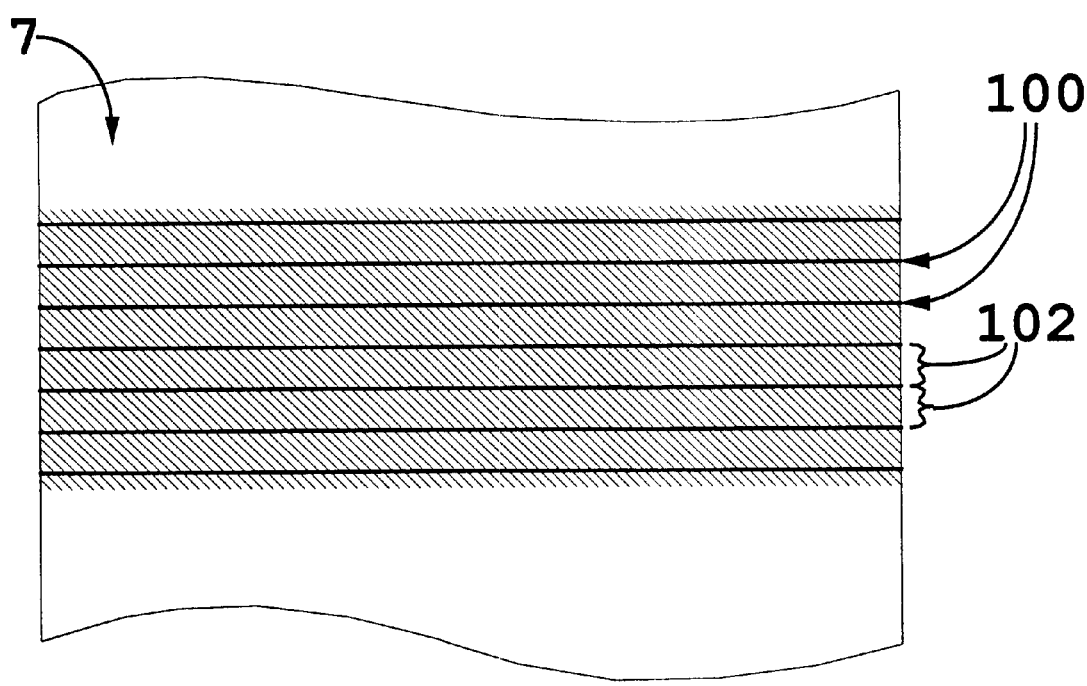
FIG. 7 depicts the appearance of unwanted visible lines on a printed image attributable to latent image degradatoin and reciprocity failure effects.

In one actual embodiment of digital printer constructed in accordance with the invention, the exposing head 1 scans back and forth across the photosensitive material, at a rate of approximately one scan per second. If all pf the light sources are normalized to the same curve Pc (FIG. 3D), the portion of the photosensitive material which is exposed by the overlap of adjacent light sources within a single scan, exposes differently than does the portion of the photosensitive material which is exposed by the overlap of adjacent scans. The essential difference is that the area within the scan exposed by adjacent light sources is exposed effectively simultaneously, while the area exposed by the overlapping scans is exposed twice with approximately one second time delay between exposures. The effects of latent image degradation and reciprocity failure combine to create a different exposure along the line where two adjacent scans of the head meet. This difference in exposure can cause the appearance of a visible line in the final image. FIG. 7 depicts a large area of uniform exposure created by several scans of light sources normalized to the same curve Pc (FIG. 3D). While the print density within a single scan 102, and from scan to scan, is consistent, the image density where adjacent scans meet 100, is different. In order to correct for these effects, the light sources at the edges of a scan must be normalized to different curves than the light sources within the scan.

FIG. 3D depicts the optimal Image Density vs. Exposure Time performance curve Pc. If all LEDs are normalized to match this curve, the image depicted in FIG. 7 results. In order to normalize the edges of the scan 100 to the same print density as the area within the scan 102, the light sources at the edge of the scan must be normalized to a different curve Pe (FIG. 3D). The normalizing of the edge light sources to curve Pe, is accomplished during the normalization process described above. During the analysis of the test image (FIG. 4), as described above, the print density differences at the edges of the scans are present in the test image. The normalization process as described above will cause the light sources at the edges of the scan to be normalized such that the print density at the edges of the scan matches the print density within the scan. The result of this normalization will be that the light sources at the edge of the scan match curve Pe, and the light sources within the scan match curve Pc.

The foregoing describes applicant's preferred method and apparatus for normalizing a plurality of light sources used to expose an image onto photosensitive material. It is recognized that numerous modifications and/or variations will occur to those skilled in the art without departing from the spirit or scope of the invention.

What is claimed is:

1. Apparatus responsive to a digital image file comprising data defining a variable print density for each of multiple pixels for producing a continuous tone and/or color composite image on a photosensitive material, said apparatus comprising:
   a head comprised of a plurality of light sources each individually energizable by a drive signal supplied thereto for exposing said photosensitive material to produce a variable density pixel image thereon;
   control circuitry for producing drive signals configured to normalize the light output from said plurality of light sources over a range of print density levels, said control circuitry comprising:
      means for producing a variable correction value for each light source which correction value is dependent upon the print density level of the pixel image to be produced; and
      means for producing drive signals of variable amplitude and/or duration in response to said digital image file data and said produced variable correction values; and
      means for applying said drive signals to said light sources.

2. The apparatus of claim 1 wherein said control circuitry applies analog drive signals to said light sources.

3. The apparatus of claim 1 wherein said control circuitry includes a digital to analog converter means for producing analog drive signals for application to said light sources.

4. The apparatus of claim 1 wherein said control circuitry includes timer means responsive to each variable correction value for varying the duration of a produced drive signal.

5. The apparatus of claim 1 wherein said means for producing correction values includes a look up table storing digital data.

6. The apparatus of claim 1 wherein said correction values are produced to normalize the outputs of said light sources to a common performance curve.

7. The apparatus of claim 1 wherein said correction values are produced to normalize the outputs of a first group of said light sources to a first performance curve and a second group of said light sources to a second performance curve.

8. The apparatus of claim 1 wherein said plurality of light sources are arranged in order including intermediate light sources and edge light sources; and wherein
   said correction values are produced to normalize the outputs of said intermediate light sources to a first performance curve and the outputs of said edge light sources to a second performance curve.

9. Apparatus responsive to a digital file representative of a source image for producing variable density pixel images to form a composite image on a target surface, said apparatus comprising:
   an imaging head including an array of pixel generators each energizable to produce a variable density pixel image on a said target surface;
   a normalizing signal source for respectively supplying normalizing signal components to said plurality of pixel generators for normalizing the pixel images produced by said pixel generators on said target surface, each such normalizing signal component having a value related to the density of the pixel image to be produced; and
   an image signal source for supplying imaging signal components to said plurality of pixel generators for producing a pixel image pattern on said target surface representative of said source image.

10. The apparatus of claim 9 wherein said normalizing signal components comprise analog drive signals supplied to said pixel generators.

11. The apparatus of claim 10 including a control processor for supplying digital control signals; and wherein
   said normalizing signal source is responsive to said digital control signals for varying the brightness and/or duration of the light output produced by each of said pixel generators.

12. The apparatus of claim 11 wherein said normalizing signal source includes digital-to-analog converter means responsive to said digital control signals for supplying a different analog drive signal to each of said pixel generators.

13. The apparatus of claim 11 wherein said normalizing signal source includes timer means responsive to said digital control signals for supplying a different duration control signal to each of said pixel generators.

14. The apparatus of claim 9 wherein said imaging signal components comprise analog drive signals supplied to said pixel generators to produce pixel images of variable light intensity on said target surface.

15. The apparatus of claim 9 including a control processor for supplying digital control signals; and wherein
   said imaging signal source is responsive to said digital control signals for varying the brightness and/or duration of the light output produced by each of said pixel generators.

16. The apparatus of claim 15 wherein said imaging signal source includes digital-to-analog converter means responsive to said digital control signals for supplying a different analog drive signal to each of said pixel generators.

17. The apparatus of claim 15 wherein said imaging signal source includes timer means responsive to said digital control signals for supplying a different duration control signal to each of said pixel generators.

18. The apparatus of claim 9 wherein each of said pixel generators is configured to produce a square pixel image on said target surface.

19. The apparatus of claim 9 wherein said plurality of pixel generators comprise a plurality of fiber optic tubes each defining an input end and an output end, and wherein said output ends are mounted in an array proximate to said target surface; and further including:

a plurality of light sources each respectively mounted proximate to the input end of a different one of said fiber optic tubes.

20. The apparatus of claim 19 wherein each of said fiber optic tubes has a square cross-section.

21. The apparatus of claim 9 wherein said target surface exhibits a certain curvature; and wherein said array of pixel generators defines a surface having substantially the same curvature as said target surface.

22. A method of controlling an array of light sources each capable of producing a variable density pixel image on a target surface, said method including the steps of:

selectively energizing said light sources to form a first test pattern image on said target surface;

scanning said first test pattern image to determine the density of each pixel image in said first test pattern image;

calculating first correction factors to normalize the pixel images in said first test pattern image; and applying said first correction factors to said light sources to produce a second test pattern image.

23. The method of claim 22 including the further steps of:

scanning said second test pattern image to determine the density of each pixel image in said second test pattern image;

calculating second correction factors to normalize the pixel images in said second test pattern image; and applying said second correction factors to said light sources to produce a third test pattern image.

\* \* \* \* \*